United States Patent
Porter et al.

(10) Patent No.: US 10,035,292 B2
(45) Date of Patent: *Jul. 31, 2018

(54) BOTTLE WITH EXTENDED NECK FINISH AND METHOD OF MAKING SAME

(71) Applicant: Silgan Plastics LLC, Chesterfield, MO (US)

(72) Inventors: Randal Porter, Norcross, GA (US); Neal Thomas, Lawrenceville, GA (US)

(73) Assignee: Silgan Plastics LLC, Chesterfield, MO (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/977,246

(22) Filed: Dec. 21, 2015

(65) Prior Publication Data

US 2017/0173841 A1 Jun. 22, 2017
US 2018/0186054 A9 Jul. 5, 2018

Related U.S. Application Data

(60) Continuation of application No. 14/098,200, filed on Dec. 5, 2013, now Pat. No. 9,248,603, which is a
(Continued)

(51) Int. Cl.
*B29C 49/00* (2006.01)
*B29C 49/42* (2006.01)
(Continued)

(52) U.S. Cl.
CPC .......... *B29C 49/0078* (2013.01); *B29B 11/08* (2013.01); *B29B 13/02* (2013.01); *B29C 49/0073* (2013.01); *B29C 49/06* (2013.01); *B29C 49/4205* (2013.01); *B29C 49/6409* (2013.01); *B29D 22/003* (2013.01); *B65D 1/023* (2013.01); *B65D 1/0246* (2013.01); *B29B 2911/1402* (2013.01); *B29B 2911/1404* (2013.01); *B29B 2911/14026* (2013.01); *B29B 2911/14033* (2013.01); *B29B 2911/1442* (2013.01); *B29B 2911/14333* (2013.01);
(Continued)

(58) Field of Classification Search
CPC ............ B29C 49/0078; B29C 49/4205; B29C 2049/4884; B29C 2049/4887; B29C 2049/4889; B29C 2049/563
USPC .................................................. 264/521, 535
See application file for complete search history.

(56) References Cited

U.S. PATENT DOCUMENTS 3,347,420 A 10/1967 Donoghue
3,581,953 A 6/1971 Donoghue
(Continued)

*Primary Examiner* — Atul P. Khare
(74) *Attorney, Agent, or Firm* — Reinhart Boerner Van Deuren S.C.

(57) ABSTRACT

A blow molded synthetic resin bottle has a body and an elongated neck with the body providing a shoulder extending about the base of the neck. The neck has a first collar extending thereabout spaced adjacent the shoulder and at least one additional collar extending thereabout adjacent the upper end of the neck. The resin in the neck is substantially unoriented. To produce the bottle, a synthetic resin preform is injection molded with a generally tubular body and the elongated neck. This preform is placed in a blow mold cavity having a body receiving portion and a neck receiving portion that has a recess extending thereabout seating the first collar therein. The additional collar is disposed outwardly of the mold cavity and is disposed on the upper surface of the mold.

20 Claims, 9 Drawing Sheets

Related U.S. Application Data continuation of application No. 12/328,696, filed on Dec. 4, 2008, now Pat. No. 8,632,722, which is a division of application No. 11/075,932, filed on Mar. 8, 2005, now abandoned.

(51) Int. Cl.

| | | |
|---|---|---|
| *B29C 49/06* | (2006.01) | |
| *B65D 1/02* | (2006.01) | |
| *B29C 49/64* | (2006.01) | |
| *B29D 22/00* | (2006.01) | |
| *B29B 11/08* | (2006.01) | |
| *B29B 13/02* | (2006.01) | |
| *B29C 45/00* | (2006.01) | |
| *B29C 49/48* | (2006.01) | |
| *B29C 49/56* | (2006.01) | |
| *B29K 67/00* | (2006.01) | |
| *B29L 31/00* | (2006.01) | |

(52) U.S. Cl.
CPC .......... *B29B 2911/14337* (2015.05); *B29B 2911/14433* (2013.01); *B29B 2911/14473* (2013.01); *B29C 2049/4884* (2013.01); *B29C 2049/4887* (2013.01); *B29C 2049/4889* (2013.01); *B29C 2049/563* (2013.01); *B29K 2067/003* (2013.01); *B29L 2031/7158* (2013.01); *B65D 2501/0018* (2013.01); *B65D 2501/0036* (2013.01); *Y10T 428/1352* (2015.01)

(56) References Cited

U.S. PATENT DOCUMENTS

| | | | |
|---|---|---|---|
| 3,628,700 | A | 12/1971 | Donoghue |
| 4,070,140 | A | 1/1978 | Lucas et al. |
| 4,201,316 | A | 5/1980 | Klingaman |
| 4,451,426 | A | 5/1984 | Branchadell |
| 4,487,568 | A | 12/1984 | Wiatt et al. |
| 4,512,948 | A | 4/1985 | Jabarin |
| 4,552,527 | A | 11/1985 | Hunter |
| 4,603,831 | A | 8/1986 | Krishnakumar et al. |
| 4,629,598 | A | 12/1986 | Thompson |
| D288,662 | S | 3/1987 | Obuchowski |
| 4,646,925 | A | 3/1987 | Nohara |
| 4,671,763 | A | 6/1987 | Weiler |
| 4,715,504 | A | 12/1987 | Chang et al. |
| 4,818,575 | A | 4/1989 | Hirata et al. |
| D304,681 | S | 11/1989 | Metaxa |
| 4,954,376 | A | 9/1990 | Krishnakumar et al. |
| D310,963 | S | 10/1990 | Segati |
| 4,971,226 | A | 11/1990 | Donoghue |
| D313,935 | S | 1/1991 | Miller |
| D316,815 | S | 5/1991 | Kalin et al. |
| 5,049,349 | A | 9/1991 | McCullough et al. |
| D321,651 | S | 11/1991 | Cochran |
| D321,829 | S | 11/1991 | Iazzetta |
| D323,617 | S | 2/1992 | Miller |
| 5,122,325 | A | 6/1992 | Bartley et al. |
| 5,169,654 | A | 12/1992 | Koga |
| D336,046 | S | 6/1993 | Donoghue |
| 5,255,889 | A | 10/1993 | Collette et al. |
| 5,330,081 | A | 7/1994 | Davenport |
| 5,364,585 | A | 11/1994 | Takeuchi |
| D353,324 | S | 12/1994 | Rice, III |
| D356,502 | S | 3/1995 | Poandl |
| D357,416 | S | 4/1995 | Valentine |
| D360,363 | S | 7/1995 | Minale |
| D360,831 | S | 8/1995 | Boisset |
| 5,447,766 | A | 9/1995 | Orimoto et al. |
| 5,588,544 | A | 12/1996 | Takashima et al. |
| D379,765 | S | 6/1997 | Hencher |
| 5,645,183 | A | 7/1997 | Slat |
| D387,993 | S | 12/1997 | Workman et al. |
| D388,712 | S | 1/1998 | Lyngdal et al. |
| 5,780,130 | A | 7/1998 | Hansen et al. |
| D400,434 | S | 11/1998 | Amos et al. |
| 5,888,598 | A | 3/1999 | Brewster et al. |
| 5,918,752 | A | 7/1999 | Meyer |
| 6,082,565 | A | 7/2000 | Harrold |
| 6,113,377 | A | 9/2000 | Clark |
| 6,209,762 | B1 | 4/2001 | Haffner et al. |
| D450,597 | S | 11/2001 | Bobchenok et al. |
| 6,312,641 | B1 | 11/2001 | Hutchinson |
| D452,159 | S | 12/2001 | Belser et al. |
| 6,382,954 | B1 | 5/2002 | Mai |
| 6,447,281 | B1 | 9/2002 | Petre |
| 6,451,243 | B1 | 9/2002 | Takada |
| 6,568,156 | B2 | 5/2003 | Silvers et al. |
| 6,572,812 | B2 | 6/2003 | Collette et al. |
| D484,419 | S | 12/2003 | Potocki et al. |
| 6,673,303 | B2 | 1/2004 | White et al. |
| 6,681,548 | B2 | 1/2004 | Silvers et al. |
| D486,072 | S | 2/2004 | Potocki et al. |
| 6,709,624 | B2 | 3/2004 | Lisch et al. |
| D498,144 | S | 11/2004 | Illenberger et al. |
| 6,824,731 | B1 | 11/2004 | Zoppas |
| 6,875,396 | B1 | 4/2005 | Limanjaya |
| D505,079 | S | 5/2005 | Mulder et al. |
| 6,890,621 | B2 | 5/2005 | Nakamura et al. |
| D511,460 | S | 11/2005 | Deubel et al. |
| D512,316 | S | 12/2005 | Illenberger et al. |
| 7,121,821 | B2 | 10/2006 | Pickel |
| 7,303,795 | B2 | 12/2007 | Neal et al. |
| 7,364,045 | B2 | 5/2008 | Dygert et al. |
| 7,491,358 | B2 | 2/2009 | Gernhuber |
| 7,531,125 | B2 | 5/2009 | Dygert et al. |
| 2002/0037338 | A1 | 3/2002 | Lisch et al. |
| 2003/0077349 | A1 | 4/2003 | Derouault et al. |
| 2004/0070119 | A1 | 4/2004 | Fibbia et al. |
| 2004/0108627 | A1 | 6/2004 | Schumann |
| 2004/0113326 | A1 | 6/2004 | Gernhuber et al. |
| 2005/0163952 | A1 | 7/2005 | Beale |
| 2007/0290413 | A1 | 12/2007 | Tonga |
| 2009/0085261 | A1 | 4/2009 | Porter et al. |
| 2009/0159482 | A1 | 6/2009 | Begley et al. |

BOTTLE WITH EXTENDED NECK FINISH AND METHOD OF MAKING SAME

CROSS-REFERENCE TO RELATED PATENT APPLICATIONS

This application is a continuation of prior U.S. application Ser. No. 14/098,200, filed Dec. 5, 2013, which is a continuation of prior U.S. application Ser. No. 12/328,696, filed Dec. 4, 2008, now U.S. Pat. No. 8,632,722, which is a divisional of prior U.S. application Ser. No. 11/075,932, filed Mar. 8, 2005, which are incorporated herein by reference in their entireties.

BACKGROUND OF THE INVENTION

The present invention relates to blow molded bottles having an elongated neck finish and to a method for making same.

Blow molded synthetic resin bottles generally have a body and a neck finish to receive a closure. They are produced in molds by blowing a heated injection molded preform outwardly against the walls of a mold cavity.

When the resin of the preform is orientable, the blow molding of the preform outwardly, both radially and longitudinally, against the walls defining the mold cavity produces orientation of the molecules of the resin. However, it is desirable to have the mold cavity snugly seat the neck finish so that it retains its molded dimensions and unoriented structure.

For some applications, bottles with neck finishes of substantial length are desired and this can produce problems when using standard automated equipment. The clearance above the mold may be limited so as to preclude the conventional preform neck finish having a positioning and gripping collar adjacent its lower end which seats on the outer surface of the mold. The preform is generally deposited in the mold cavity by a gripper which engages the collar on the neck finish and that collar seats on the upper surface of the mold to position the preform properly within the mold cavity.

It is an object of the present invention to provide a novel synthetic resin bottle having an extended neck finish.

It is also an object to provide such a bottle which can be readily fabricated in existing blow molding equipment.

Another object is to provide a novel method for making synthetic resin blow molded bottles with extended neck finishes.

SUMMARY OF THE INVENTION

It has now been found that the foregoing and related objects may be attained in a blow molded synthetic resin bottle having a body and a neck finish. The body provides a shoulder extending about the base of the neck finish. Generally, the neck finish is elongated and may have a first collar extending thereabout adjacent the shoulder. The neck finish also has at least one additional collar extending thereabout adjacent its upper end. The resin in the first collar and in the remainder of the neck finish thereabove is substantially unoriented.

Generally, the neck portion has a thread formation thereabout above the at least one additional collar, and the first collar may be provided with lugs configured and dimensioned to cooperate with a child-resistant cap which engages therewith. Desirably, the first collar has an upper portion of substantially the same diameter as the other collar and a lower portion of larger diameter. The upper portion may have circumferentially spaced lugs to provide engagement with a child-resistant cap. Preferably, the other collar comprises a pair of axially spaced rings adapted to seat a carrier arm or gripper therebetween.

In the method for making the synthetic resin blow molded bottles, a synthetic resin preform is injection molded with a generally tubular body portion and a neck finish. The neck finish will generally have the first collar adjacent the body portion and a second collar adjacent the upper end portion of the neck finish. The preform is heated and placed in a blow mold cavity having a body receiving portion and a neck finish receiving portion which includes a recess extending thereabout and seating the first collar therein. The additional collar is disposed outwardly of the mold cavity and seats on the upper surface of the mold.

The body portion of the preform is blown into conformity with the walls of the body portion of the cavity to provide a blow molded synthetic resin bottle having a body and a neck finish.

DETAILED DESCRIPTION OF THE PREFERRED EMBODIMENTS

Figure 1:
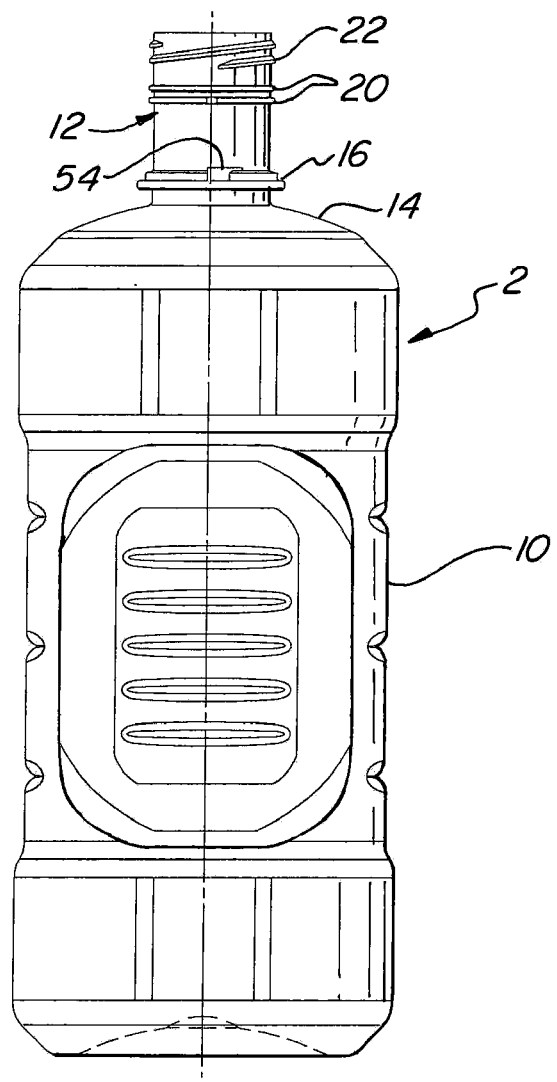
FIG. 1 is a perspective view of a bottle with an extended neck finish embodying the present invention.

Turning first to FIG. 1, a bottle generally designated by the numeral 2 and embodying the present invention has an elongated cylindrical body 10 and an extended neck finish generally designated by the numeral 12. Adjacent the shoulder portion 14 at the upper end of the body 10 is a first collar 16 on the neck finish 12. A second collar generally designated by the numeral 18 and comprising a pair of axially spaced transfer rings 20 is provided adjacent the upper end of the neck finish 12. Spaced above the second collar 18 are thread formations 22 which will engage with cooperating formations on the closure (not shown).

Figure 2:
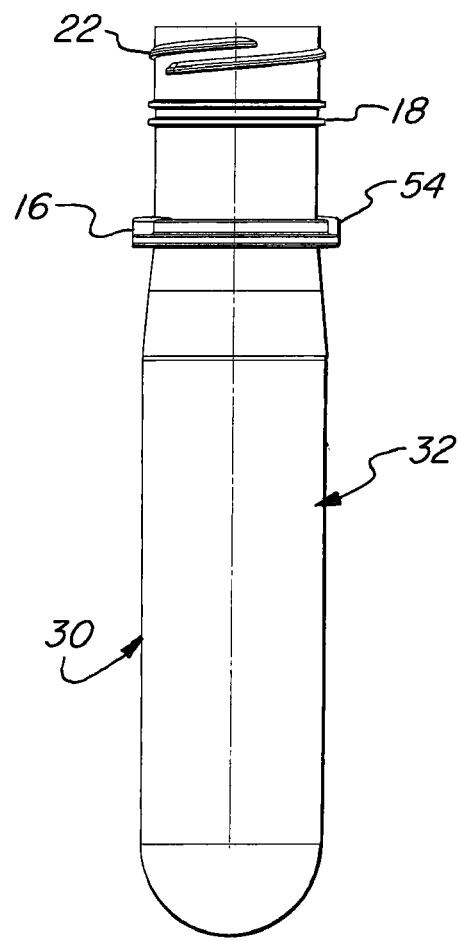
FIG. 2 is a side elevational view of the preform to produce the bottle of FIG. 1.

Turning next to FIG. 2, a hollow preform generally designated by the numeral 30 is molded with the desired neck finish shown in FIG. 1 and an elongated, generally tubular body portion 32.

Figure 3:
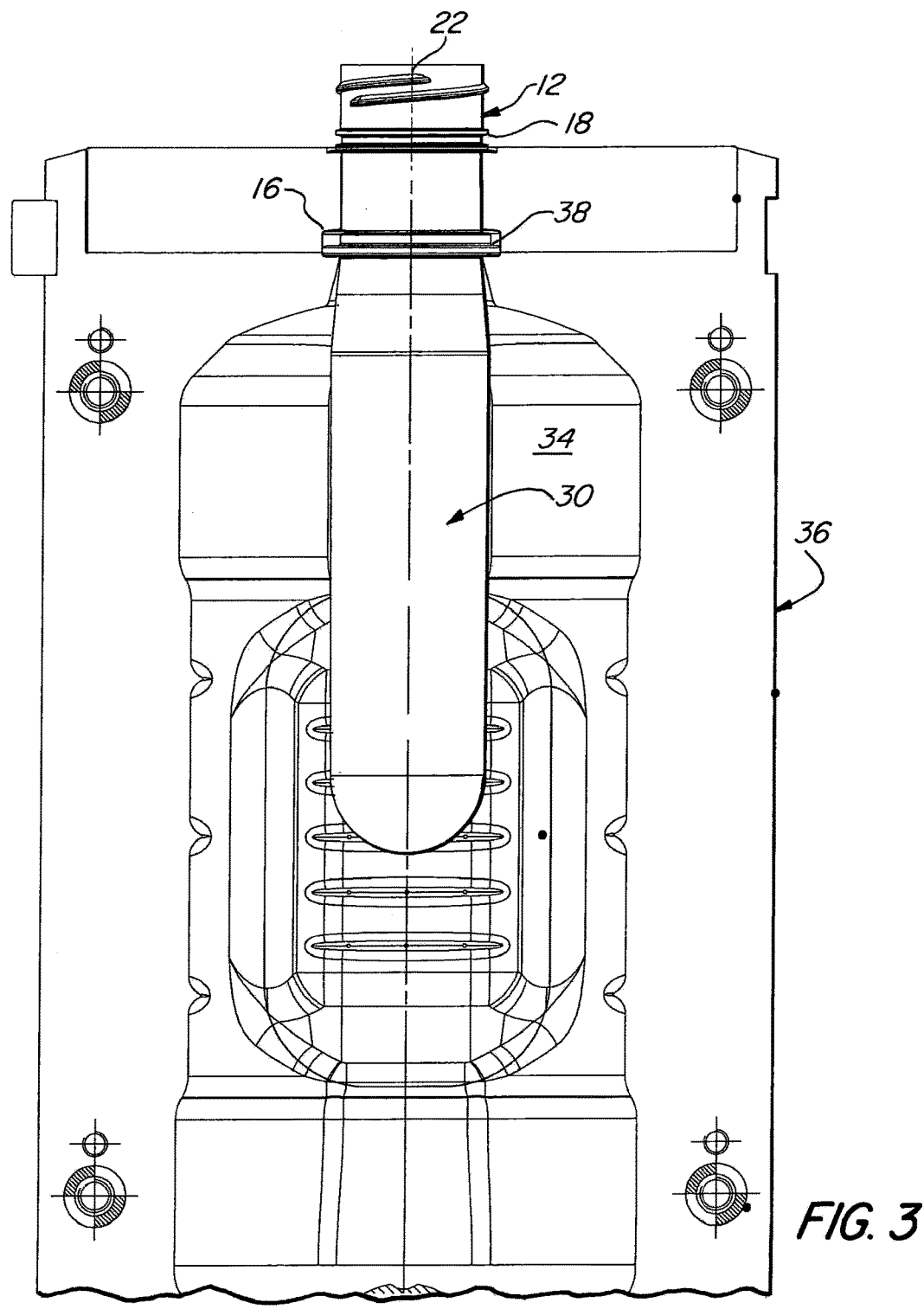
FIG. 3 is a fragmentary view of the preform for the bottle of FIG. 1 seated in a blow mold shown in section.
Figure 4A:
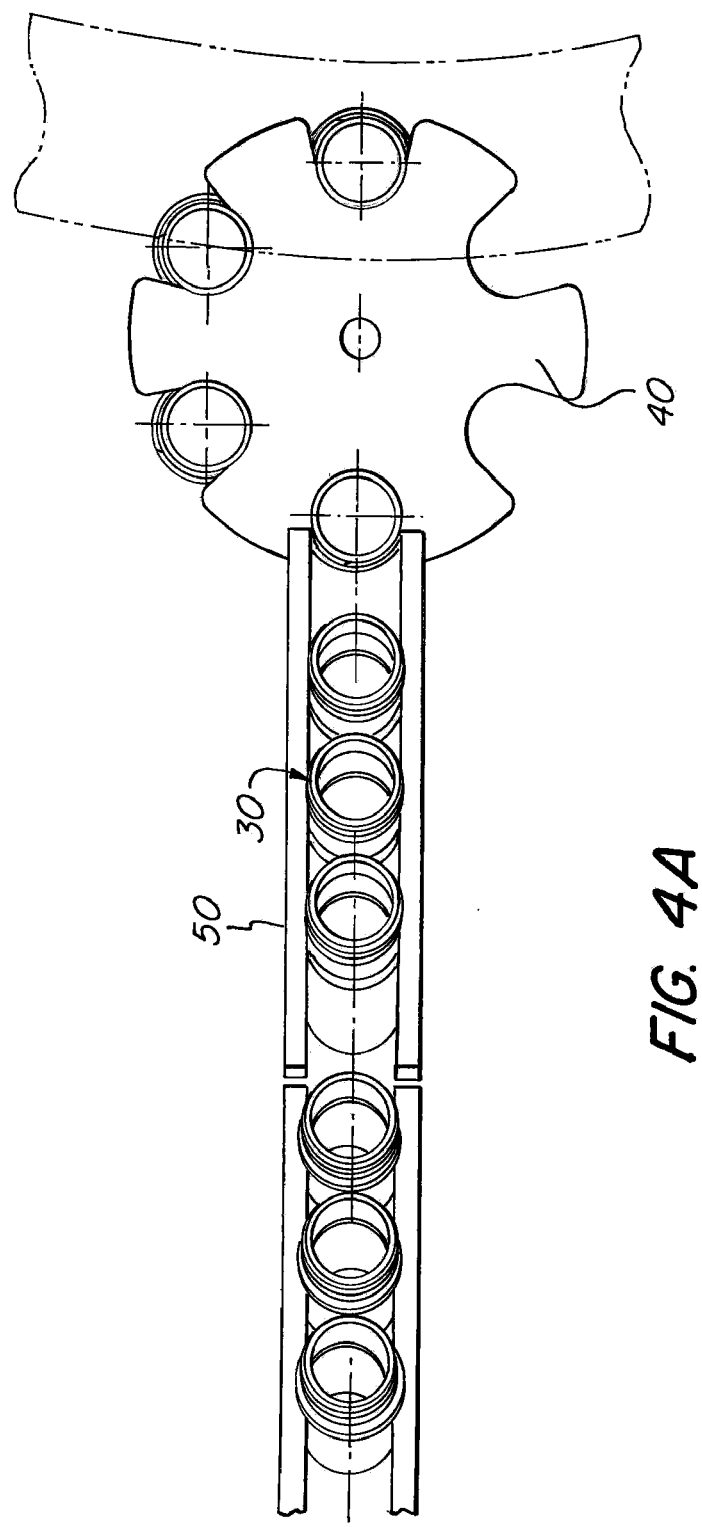
FIG. 4a is a diagrammatic top view of preforms being fed on a pair of rails into, and seated in, an infeed wheel.
Figure 4B:
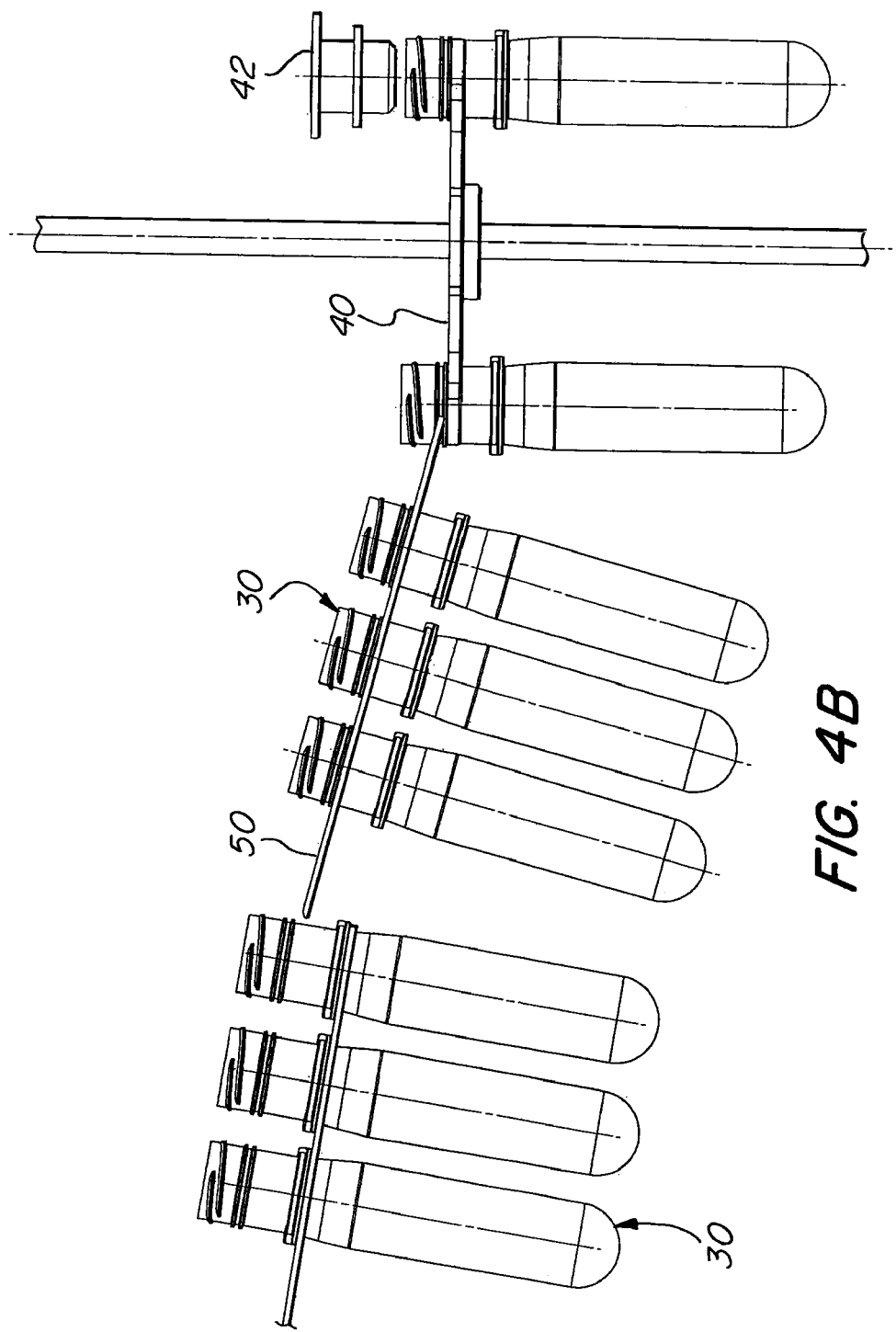
FIG. 4b is a diagrammatic side view of the preforms being moved along infeed rails to the infeed wheel and a spindle about to be inserted into a preform.
Figure 5:
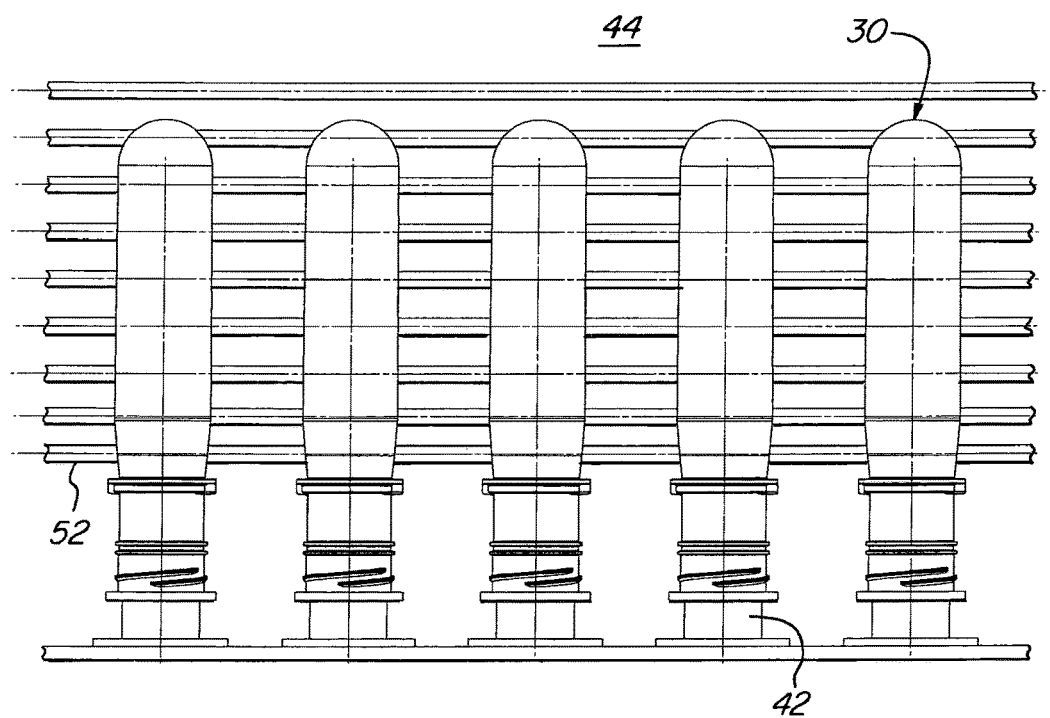
FIG. 5 is a diagrammatic view of the preforms being carried on spindles through a heating chamber.
Figure 6:
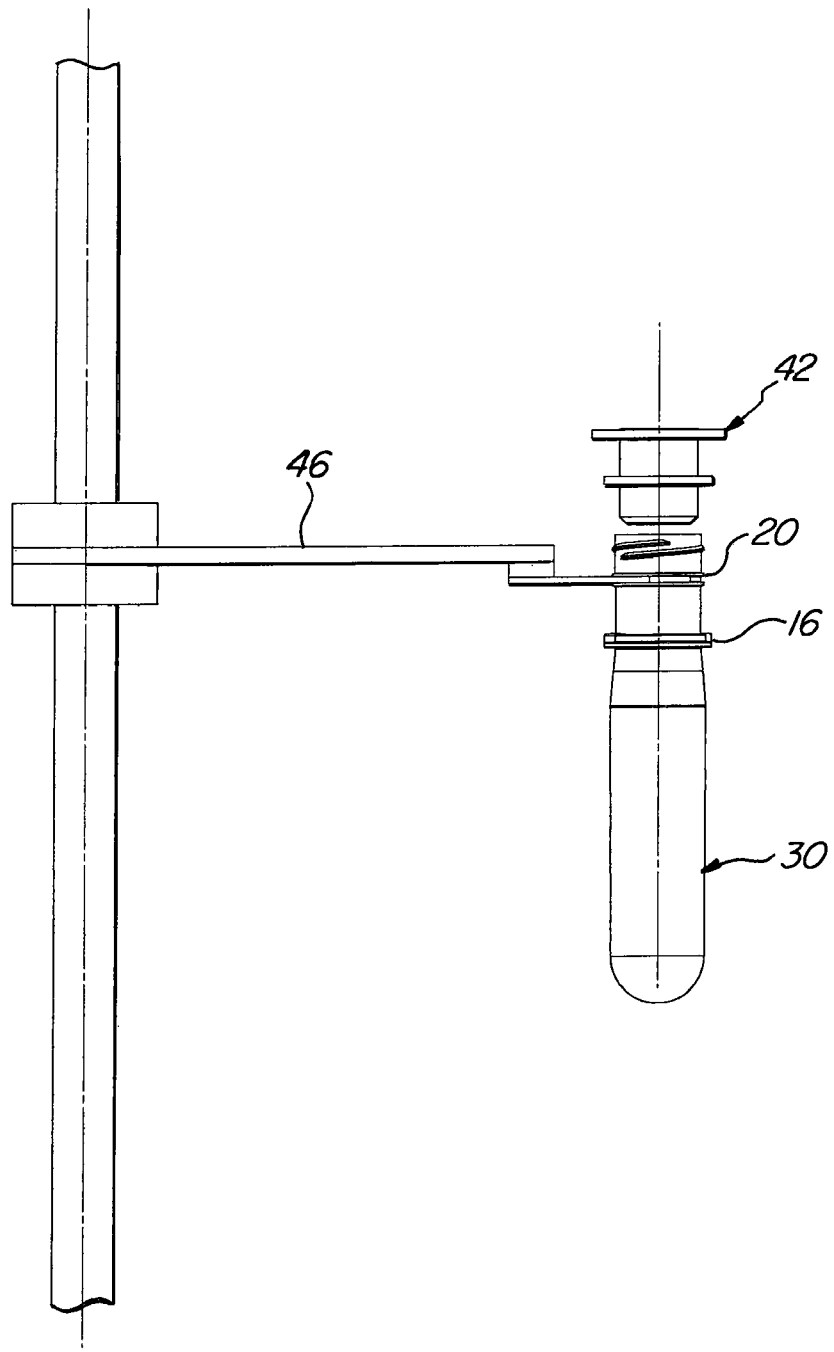
FIG. 6 is a diagrammatic view of the preform disposed in a gripper and the spindle being withdrawn therefrom.
Figure 8:
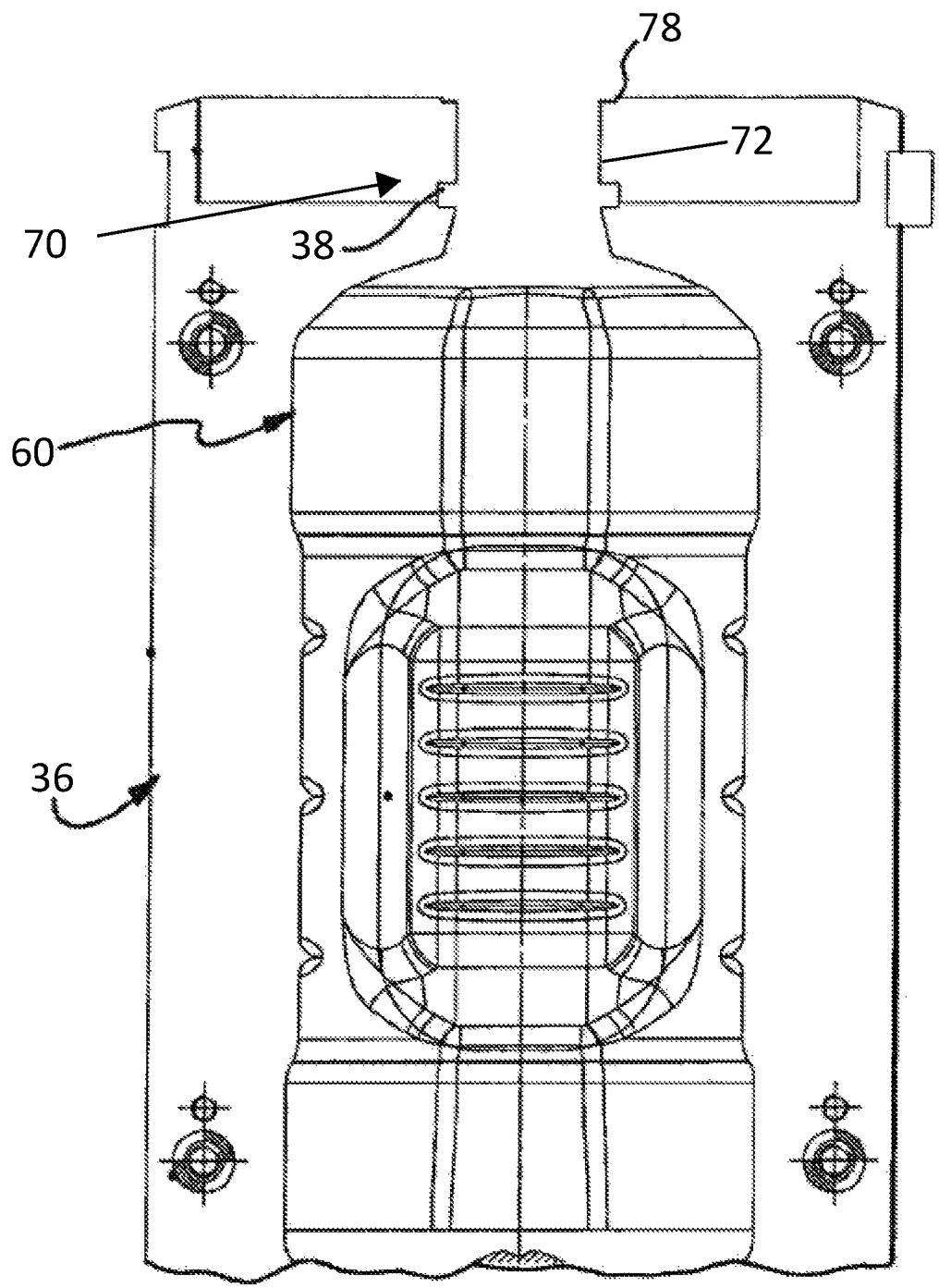
FIG. 8 is a sectional view of the mold.

As seen in FIG. 3, the preform 30 is placed in the cavity 34 of a blow mold generally designated by the numeral 36 and the lower portion of the neck finish 12 including the first collar 16 is seated in the mold cavity 34. Shown in FIG. 8 is a sectional view of the blow mold 36. As shown in FIGS. 3 and 8, the mold cavity 34 includes a body receiving portion 60 and a neck receiving portion 70. As also shown in FIG.

Figure 7:
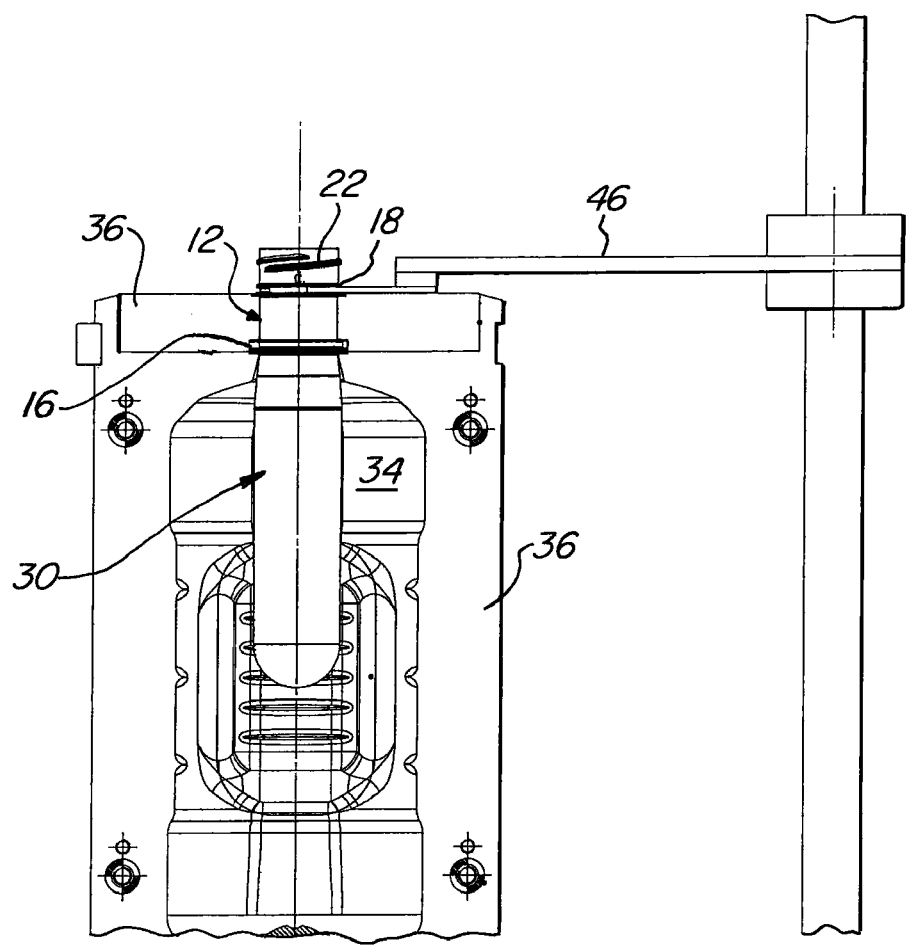
FIG. 7 is a diagrammatic illustration of the preform being deposited in the mold by the gripper.

8, the neck receiving portion 70 has a circumferential recess 38. As shown in FIG. 3, when the preform 30 is placed in the cavity 34 of the blow mold, the first collar 16 is seated in the circumferential recess 38. As seen in FIG. 3, the height of the first collar 16 is substantially the same as the height of the circumferential recess 38. Thus, as illustrated in FIG. 3, when the first collar 16 is seated within the circumferential recess 38 (such as shown in FIG. 3), vertical movement of the preform 30 relative to the blow mold 36 is restricted. The upper portion of the neck finish 12 including the second collar 18 and thread formations 22 are disposed above the mold 36. As shown in FIGS. 3 and 8, the neck receiving portion 70 of the blow mold 36 also includes a neck cavity 72. As shown in FIGS. 3, 7 and 8, the height of the neck cavity 72 generally corresponds to the distance between the first collar 16 and the second collar 18. As also shown in FIGS. 3, 7 and 8, the width of the neck cavity 72 is substantially the same as the width of the neck finish 12 located between the first collar 16 and second collar 18.

In the process of molding the bottle of the present invention as seen in FIGS. 4-7, the molded preforms 30 are fed along rails 50 and loaded into an infeed wheel 40 which is at the same level as the top surface of the mold 36. A spindle nose 42 is moved downwardly into the neck finish 12 of the preform 30, and it carries the preform 30 through an oven 44 in which it is conditioned by the heat lamps 52. The neck finish 12 is desirably shielded as the preform passes through the oven 44 and the spindle nose 42 is rotated to rotate the preform 30 to provide uniform heating. When the preform 30 exits the oven 44, the neck finish 12 is disposed upwardly. At the end of the oven 44, a gripper 46 engages the preform neck finish 12 between the transfer rings 20 of the second collar 18, and the spindle nose 42 is withdrawn therefrom and moved upwardly. As shown in FIGS. 3 and 8, the neck receiving portion 70 of the blow mold 36 includes a circumferential seat 78 located along the top surface of the mold 36. The gripper 46 carries the preform 30 to the mold 36 and deposits the preform 30 in the mold cavity 34 with the second collar 18 being disposed above and seating on the top surface of the mold 36 in the circumferential seat 78. The mold 36 is then closed about the preform 30. Following the blow and cool cycle, the finished bottle 2 is removed from the mold 36. As shown in FIGS. 3, 7 and 8, the width of the neck cavity 72 is less than the width of the circumferential seat 78 and less than the width of the circumferential recess 38.

In the illustrated embodiment, the lower collar 16 has a stepped configuration with the upper step being of lesser diameter and providing a pair of lugs 54 which cooperate with a closure (not shown) to provide a child-proof and/or tamper-evident bottle.

As is well known, some resins can be oriented to provide greater strength in smaller thicknesses, and polyethylene terephthalate (PET) resins are widely employed. However, polyolefins and other non-orientable resins are also blow molded.

Since the neck finish must be formed to relatively close tolerances to mate securely and seal with a closure, it is desirable to mold the desired neck finish as a part of the preform. To avoid distortion of the neck finish during the blow molding of the bottle body, most of the neck finish is seated in a closely conforming cavity in the mold so that it will not be expanded during the blowing operation.

To facilitate transfer of the preform from the injection molding machine and proper positioning in the blow mold, the second collar is formed on the neck finish adjacent its upper end. This collar can ride on a pair of rails for movement from the molding station to the blowing station. It is also engageable by a gripper for controlled movement of the preform, and it seats on the mold or in a cooperating recess in the mold cavity.

In the illustrated embodiment, this grippable and positioning collar is provided by a pair of axially spaced flanges and the gripper engages between them. However, a single circumferential flange may be employed, desirably with a groove immediately thereabove to seat the gripper.

Because of the elongated neck finish, this collar and the closure may be encircled by a shrink wrapped band in the filled bottle to create a tamper evident seal.

Thus, it can be seen that bottles with extended neck finishes can be readily produced by providing molds which have a cavity configured to receive the lower portion of the elongated neck finish including a collar spaced closely to the shoulder on the body of the bottle. The upper or second collar is positioned to be disposed above the upper surface of the mold, and the protruding upper portion of the neck finish is within the vertical clearance provided in most conventional blow molding equipment.

What is claimed is:

1. A method for making a container, the method comprising:
   providing a preform including a closed body, a neck located between the closed body and an open end, and an outwardly extending collar and thread formation each located along the neck, wherein the thread formation is located between the open end and the collar;
   providing a mold having a coextensive body receiving portion and neck receiving portion, wherein the neck receiving portion includes a circumferential recess extending upwardly from the body receiving portion and a neck cavity extending upwardly from the circumferential recess;
   closing the mold about the preform while an exterior of the neck is held by a gripper so that the closed body of the preform is received within the body receiving portion of the closed mold, the thread formation is located outside of the neck receiving portion of the closed mold, and a first portion of the neck extending upwardly from the collar is engaged within the neck cavity of the closed mold, wherein the collar of the preform is engaged and seated within the circumferential recess of the neck receiving portion of the closed mold and the width of the neck cavity and circumferential recess of the closed mold are substantially the same as the width of the first neck portion and collar, respectively, so as to restrict vertical movement of the preform relative to the closed mold; and
   blowing the closed body of the preform into conformity with walls of the body receiving portion of the closed mold.

2. The method of claim 1, wherein the collar has a height, the circumferential recess has a height, and the height of the collar is substantially the same as the height of the circumferential recess.

3. The method of claim 1, further comprising heating the preform prior to said closing.

4. The method of the 3, further comprising rotating the preform about a longitudinal axis of the preform during said heating of the preform.

5. The method of claim 1, wherein the gripper conducts said holding between a pair of axially spaced rings of the neck during said closing of the mold.

6. The method of claim 1, wherein the gripper contacts an outer surface of the mold during said closing.

7. The method of claim 1, wherein the blowing is conducted such that only the closed body portion of the preform is blown into conformity with the walls of the body receiving portion of the closed mold.

8. A method for making a container, the method comprising:
provide a preform including a closed body, a neck located between the closed body and an open end, an outwardly extending first collar located at a first position along the neck, and an outwardly extending second collar located at a second position along the neck, the first collar located between the closed body and the second collar;
providing a mold having a coextensive body receiving portion and neck receiving portion, the neck receiving portion including a circumferential recess and a neck cavity each having a height, the circumferential recess extending upwardly from the body receiving portion, the neck cavity extending upwardly from the circumferential recess, and the height of the neck cavity generally corresponding to the distance between the first and second positions;
closing the mold about the preform while an exterior of the neck is held by a gripper such that the closed body of the preform is received with the body receiving portion of the closed mold, a first portion of the neck extending upwardly from the first collar is engaged within the neck cavity of the closed mold, and the first collar is seated in the circumferential recess of the neck receiving portion of the closed mold, wherein a width of the neck cavity and circumferential recess of the closed mold are substantially the same as the width of the first neck portion and collar, respectively; and
inflating the closed body of preform into conformity with walls of the body receiving portion of the closed mold.

9. The method of claim 8, further comprising heating the preform prior to said closing.

10. The method of the 9, further comprising rotating the preform about a longitudinal axis of the preform during said heating of the preform.

11. The method of claim 10, wherein said rotating is conducted by a spindle inserted into the open end of the preform.

12. The method of claim 8, wherein the gripper conducts said holding between a pair of axially spaced rings of the second collar during said closing of the mold.

13. The method of claim 8, wherein said inflating is conducted such that only the closed body of the preform is inflated.

14. A method for making a container from a preform, the method comprising:
providing a preform including a closed body, a neck located between the closed body and an open end, and a first and second outwardly extending collar, the first collar located between the closed body and the second collar;
providing a mold having a coextensive body receiving portion and neck receiving portion, the neck receiving portion including a circumferential recess extending upwardly from the body receiving portion, a neck cavity extending upwardly from the circumferential recess, and a circumferential seat, the neck cavity located between the circumferential recess and the circumferential seat;
closing the mold about the preform while an exterior of the neck is held by a gripper such that the closed body of the preform is received with the body receiving portion of the closed mold, a first portion of the neck extending upwardly from the collar is engaged within the neck cavity of the closed mold, and the first collar is seated in the circumferential recess of the neck receiving portion of the closed mold, wherein the width of the neck cavity of the closed mold is less than the width of each of the circumferential seat and the circumferential recess of the closed mold, and wherein the width of the neck cavity and circumferential recess of the closed mold are substantially the same as the width of the first neck portion and collar, respectively; and
inflating the closed body of preform into conformity with walls of the body receiving portion of the closed mold.

15. The method of claim 14, wherein the second collar is seated on the circumferential seat of the closed mold.

16. The method of claim 14, wherein said inflating is conducted such that only the closed body of the preform is inflated into conformity with the walls of the body receiving portion of the mold.

17. The method of claim 14, further comprising heating the preform prior to said closing.

18. The method of the 17, further comprising rotating the preform about a longitudinal axis of the preform during said heating of the preform.

19. The method of claim 14, wherein the gripper conducts said holding between a pair of axially spaced rings of the second collar during said closing of the mold.

20. The method of claim 14, wherein the gripper contacts an outer surface of the mold during said closing.

* * * * *